United States Patent [19]
Shimizu et al.

[11] Patent Number: 5,650,862
[45] Date of Patent: Jul. 22, 1997

[54] IMAGE SIGNAL PROCESSING APPARATUS WITH IMPROVED PIXEL PARALLEL/LINE PARALLEL CONVERSION

[75] Inventors: Hideaki Shimizu; Masahiro Funada, both of Yokohama; Ryosuke Miyamoto, Urayasu; Hiroyuki Ichikawa, Kawasaki; Masanori Sakai, Yokohama; Hiroyuki Yaguchi, Inagi; Yasuhiro Takiyama, Kawasaki; Tadashi Takahashi, Yokohama, all of Japan

[73] Assignee: Canon Kabushiki Kaisha, Tokyo, Japan

[21] Appl. No.: 502,763

[22] Filed: Jul. 14, 1995

[30] Foreign Application Priority Data

Jul. 25, 1994 [JP] Japan .................................. 6-172337

[51] Int. Cl.$^6$ ............................................. H04N 1/40
[52] U.S. Cl. ..................... 358/448; 358/443; 358/444; 382/254; 382/302
[58] Field of Search .............................. 358/448, 443, 358/447, 457, 471, 460, 494, 444, 404, 445; 382/205, 254, 304; H04N 1/40

[56] References Cited

U.S. PATENT DOCUMENTS

| | | | |
|---|---|---|---|
| 5,003,380 | 3/1991 | Hirota | 358/500 |
| 5,130,820 | 7/1992 | Hirota | 358/447 |
| 5,268,771 | 12/1993 | Murakami et al. | 358/457 |
| 5,301,039 | 4/1994 | Tanioka | 358/457 |
| 5,414,530 | 5/1995 | Sakai | 358/451 |
| 5,557,734 | 9/1996 | Wilson | 395/162 |

*Primary Examiner*—Edward L. Coles, Sr.
*Assistant Examiner*—Madeleine A.V. Nguyen
*Attorney, Agent, or Firm*—Fitzpatrick, Cella, Harper & Scinto

[57] ABSTRACT

An image signal processing apparatus includes an input unit for inputting an image signal for each of at least one input line, and a conversion unit for converting the input image signal for each input line into parallel converted image signals for a plurality of output lines and for outputting the converted image signals. A processing unit is then provided for performing image processing for each of the converted image signals for the plurality of output lines.

8 Claims, 11 Drawing Sheets

IMAGE SIGNAL PROCESSING APPARATUS WITH IMPROVED PIXEL PARALLEL/LINE PARALLEL CONVERSION

BACKGROUND OF THE INVENTION

1. Field of the Invention

This invention relates to an image signal processing apparatus for performing image processing, such as filtering processing and the like, for image signals in a copier, a facsimile apparatus or the like.

2. Description of the Related Art

An ordinary digital image processing apparatus, such as a copier, a facsimile apparatus or the like, includes a plurality of units for performing matrix processing, such as digital filters or the like, used in edge emphasis and smoothing processing. Matrix processing for an image signal will now be described with reference to FIG. 10. A description will be provided of a case of using a 9×9 square matrix. The image signal is transferred according to a raster scanning method in units of a line.

Figure 10:
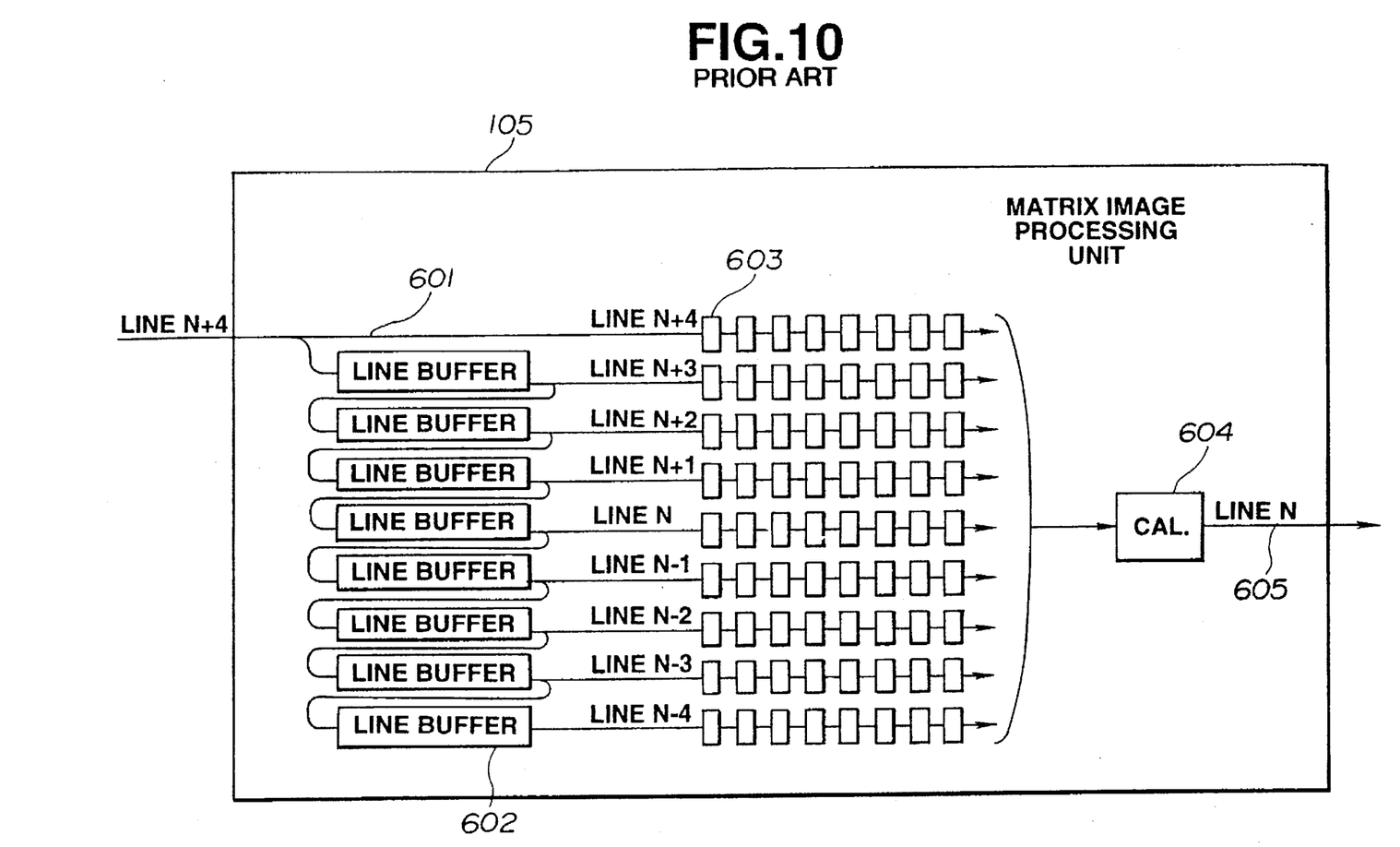
FIG. 10 is a diagram illustrating an ordinary matrix image processing unit.

In FIG. 10, reference numeral 601 represents an image signal for a line (line N+4) which is currently being transferred. Each of eight line buffers 602 delays an image signal for one line. Eight flip-flop circuits 603 are provided for each line. An image signal for the immediately preceding line N+3 is delayed by one line by the line buffer 602, and is input to the flip-flop circuits 603 for delay in the main scanning direction simultaneously with the image signal for line N+4. Similarly, each of image signals for lines N+2, N+1, N, N−1, N−2, N−3, and N−4 is delayed by one line by the corresponding line buffer 602, and is input to the flip-flop circuits 603 for delay in the main scanning direction in synchronization with the image signal for line N+4. Thus, image signals for nine consecutive lines in the sub-scanning direction constituting the 9×9 matrix are formed.

Each of the image signals for the nine lines is delayed by one pixel by each of the eight flip-flop circuits 603 to establish a delay in the main scanning direction provided for each line. Accordingly, by using one pixel signal not delayed by the flip-flop circuits 603 and eight pixel signals delayed thereby, nine consecutive pixel signals in the main scanning direction constituting the 9×9 matrix are formed. The 9×9 pixel signals are input to a calculation circuit 604, which performs predetermined calculations and outputs an image signal 605 for line N.

A description has been provided of a matrix image processing unit in an ordinary digital image processing apparatus. In recent digital image processing apparatuses, however, high-speed transfer of an image signal is indispensable due to the synergistic effect of demand for improved processing capability and demand for high resolution. The speed of the circuitry of the matrix image processing unit having the above-described configuration is insufficient for realizing such high-speed transfer. Hence, it is necessary to realize high-speed transfer of an image signal using a low-speed matrix image processing unit.

For that purpose, a method of reducing the transfer speed by rearranging the image signal serially transferred at a high speed in the order of pixels into a parallel state can be considered. For example, in pixel parallel processing in which parallel processing is performed in units of a pixel, the transfer speed can be reduced to ½ if parallel processing is performed for two pixels, and the transfer speed can be reduced to ⅓ if parallel processing is performed for three pixels. Alternatively, for example, line division parallel processing in which parallel processing is performed by dividing an image signal for one line into a plurality of signals in the direction of the line can also be considered.

In such parallel processing, as a result of performing relatively-low-speed image processing in parallel, high-speed image processing is realized, so that an image signal can be transferred at a high speed.

Figure 11:
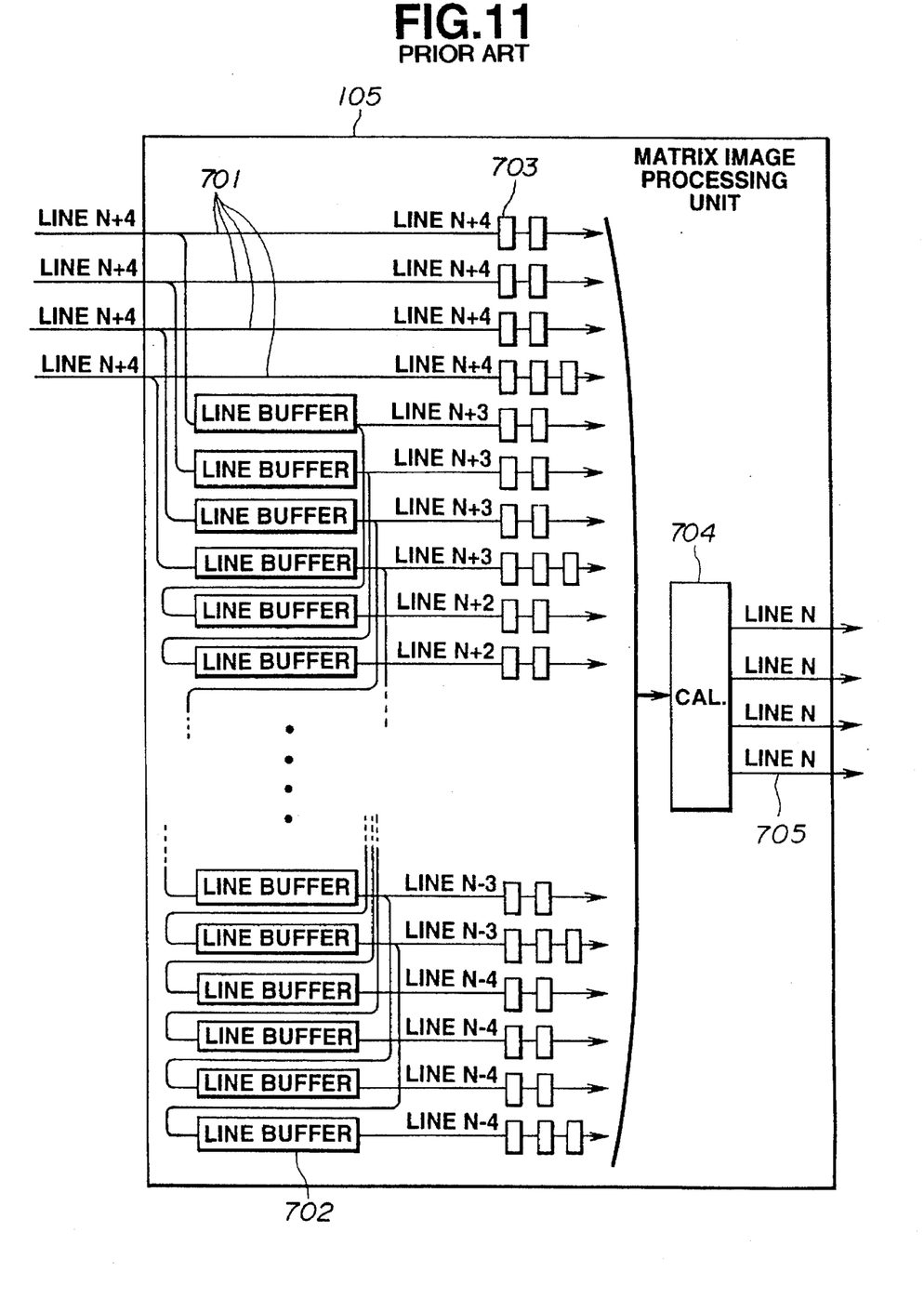
FIG. 11 is a diagram illustrating a conventional matrix image processing apparatus.

However, the circuit configuration when performing the above-described image processing using a matrix by parallel processing becomes very complicated. FIG. 11 illustrates the circuit configuration in such a case. In FIG. 11, a case of performing parallel processing for four pixels in order to reduce the transfer speed to ¼ is illustrated.

As in the case of FIG. 10, reference numeral 701 represents an input image signal for line N+4. Four pixel signals n, n+1, n+2 and n+3 for line N+4, which are consecutive in the main scanning direction as a result of serial/parallel conversion in preprocessing, are simultaneously input in parallel. In order to perform the same 9×9 matrix processing as in the above-described case for the four pixel signals input in parallel, 32 line buffers 702 for forming image signals for 9 lines in the sub scanning direction are required. Accordingly, the number of line buffers is four times the number in the case of FIG. 10.

Since one line is divided into four portions, the capacity required for each line buffer 702 is ¼ of the capacity in the case of FIG. 10. Accordingly, the total capacity of the buffers is the same as that in the case of FIG. 10. Actually, however, since the available lineup of ordinary line buffers lacks such variations in capacity, the total cost of line buffers is considerably increased.

In general, other portions than the line buffers 702, i.e., the portions of flip-flop circuits 703 and a calculation circuit 704, in the matrix image processing unit 105 are provided in the form of a one-chip ASIC (application specific integrated circuit). When providing a one-chip ASIC for this pixel parallel processing, the number of terminals for input signals causes a big problem. That is, if an image signal for each input is assumed to comprise 8 bits, the total required number of terminals of the ASIC becomes:

9 (lines)×4 (pixels in parallel)×8 (bits)=288, and therefore it is very difficult to produce such an ASIC. Accordingly, the pixel parallel processing has two problems, i.e., an increase in the cost of the line buffers, and a limitation in providing an ASIC.

SUMMARY OF THE INVENTION

The present invention has been made in consideration of the above-described problems.

It is an object of the present invention to realize high-speed execution of complicated image processing, such as matrix calculation or the like, with a simple configuration.

It is another object of the present invention to realize high-speed execution of image processing for image signals input for respective lines with a simple configuration.

It is still another object of the present invention to realize high-speed image processing in a digital copier, a facsimile apparatus or the like.

According to one aspect, the present invention, which achieves these objectives, relates to an image signal processing apparatus comprising input means for inputting an image signal for each line, conversion means for converting the image signal for each line input from the input means into image signals parallel for a plurality of lines and for outputting the converted image signals, and processing means for performing image processing for each of the image signals for the plurality of lines output in parallel from the conversion means.

In one embodiment, the processing means performs the same image processing in parallel for each of the image signals for the plurality of lines.

In another embodiment, the processing means peforms matrix calculation by forming an image matrix by delaying each of the image signals for the plurality of lines.

According to another aspect, the present invention relates to an image signal processing apparatus comprising input means for inputting an image signal for each line, conversion means for converting the image signal for each line input from the input means into image signals parallel for a plurality of lines and for outputting the converted image signals, a plurality of delay means for delaying each of the image signals for the plurality of lines output in parallel from the conversion means, and processing means for performing image processing for the image signals for the plurality of lines delayed by the plurality of delay means.

According to still another aspect, the present invention relates to an image signal processing method comprising the steps of inputting an image signal for each line, converting the image signal for each line input in the inputting step into image signals parallel for a plurality of lines, and performing image processing for each of the image signals for the plurality of lines output in parallel in the converting step.

The foregoing and other objects, advantages and features of the present invention will become more apparent from the following description of the preferred embodiments taken in conjuction with the accompanying drawings.

DESCRIPTION OF THE PREFERRED EMBODIMENTS

First Embodiment

A first preferred embodiment of the present invention will now be described in detail with reference to the drawings.

Figure 1:
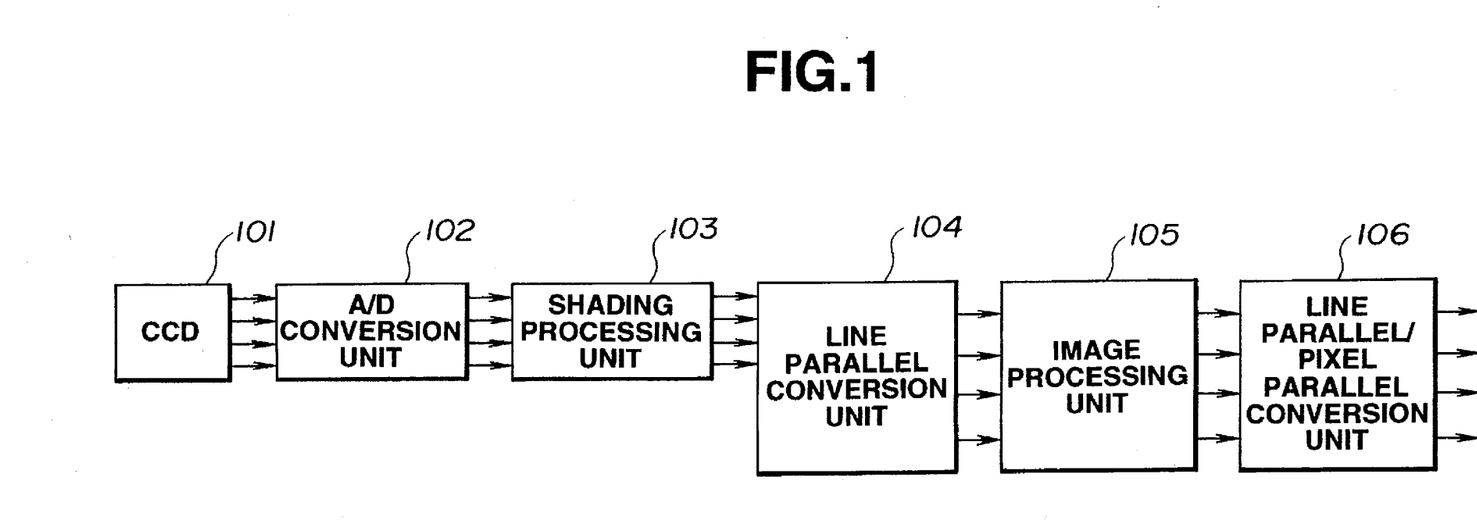
FIG. 1 is a diagram illustrating the configuration of an image processing apparatus according to a first embodiment of the present invention.

FIG. 1 is a diagram illustrating the configuration of an image processing apparatus of the embodiment. In FIG. 1, a CCD line sensor 101 reads an image on the surface of a sheet, and converts the read image into an electrical signal for each pixel by photoelectric conversion. The configuration of the CCD line sensor 101 will now be described in more detail with reference to FIG. 2.

Figure 2:
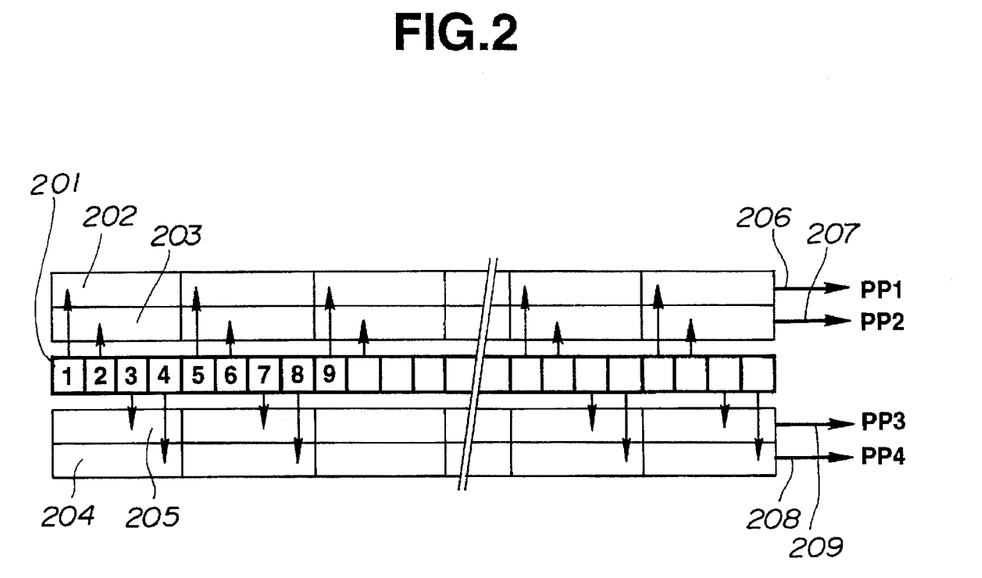
FIG. 2 is a diagram illustrating the configuration of a CCD (charge-coupled device) line sensor shown in FIG. 1.

In FIG. 2, reference numeral 201 represents a photodiode element for converting an amount of light into electric charges. An array comprising thousands of photodiode elements 201 arranged in a line provides a line sensor. In order to transfer accumulated electric charges at high speed, two pairs of CCD's 202 and 203, and 204 and 205 are provided in four lines at two sides of the photodiode elements 201. After the lapse of a predetermined time period, electric charges are transferred from the photodiode elements 201 to the CCD's 202–205 in such a manner that electric charges from pixels 1, 5, . . . , 4n+1, pixels 2, 6, . . . , 4n+2, pixels 3, 7, . . . , 4n+3, and pixels 4, 8, . . . , 4n+4 are transferred to the CCD's 202, 203, 204 and 205, respectively, where n is an integer such as 0, 1, 2, . . . The pixel signals in the CCD's 202–205 are shifted in the direction of the CCD line, and are output to output units 206, 207, 208 and 209, respectively. Thus, the output of the CCD line sensor 101 is transferred as parallel image signals in units of four pixels.

Referring again to FIG. 1, an A/D (analog-to-digital) conversion unit 102 amplifies analog image signals output in parallel in units of four pixels from the CCD line sensor 101, and converts the signals into four digital image signals. A shading processing circuit 103 receives digital image signals in parallel in units of four pixels, and peforms black correction and white correction of the image signals in the direction of the line. In this stage, the image read by the CCD line sensor 101 is converted into the form of normalized digital image signals.

Figure 3:
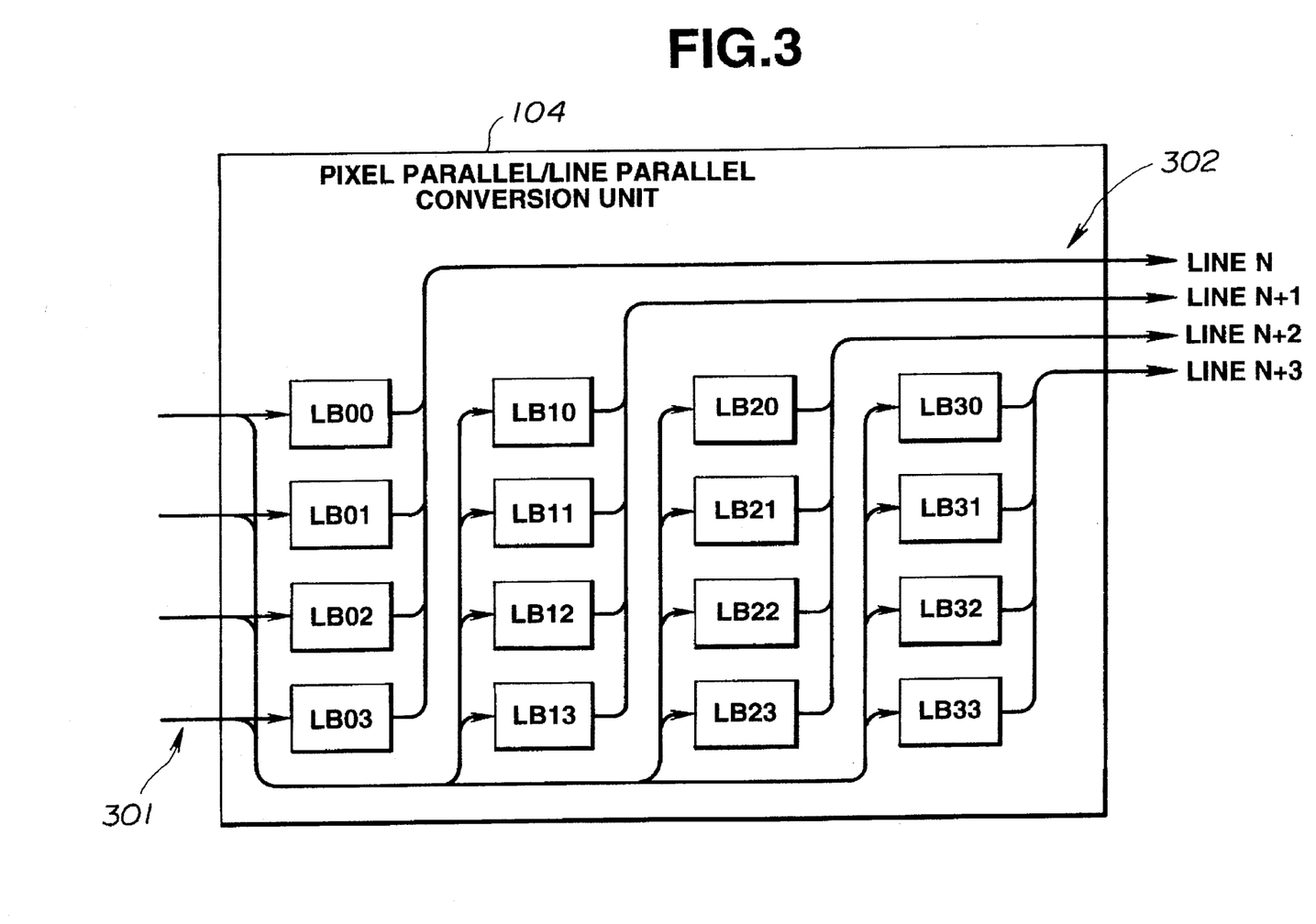
FIG. 3 is a diagram illustrating the configuration of a pixel parallel/line parallel conversion unit shown in FIG. 1.

A pixel parallel/line parallel conversion unit 104 in the following stage converts the image signals transferred in parallel in units of four pixels into the form of 4-line parallel transfer. FIG. 3 is a block diagram illustrating the configuration of the pixel parallel/line parallel conversion unit 104.

Figure 4:
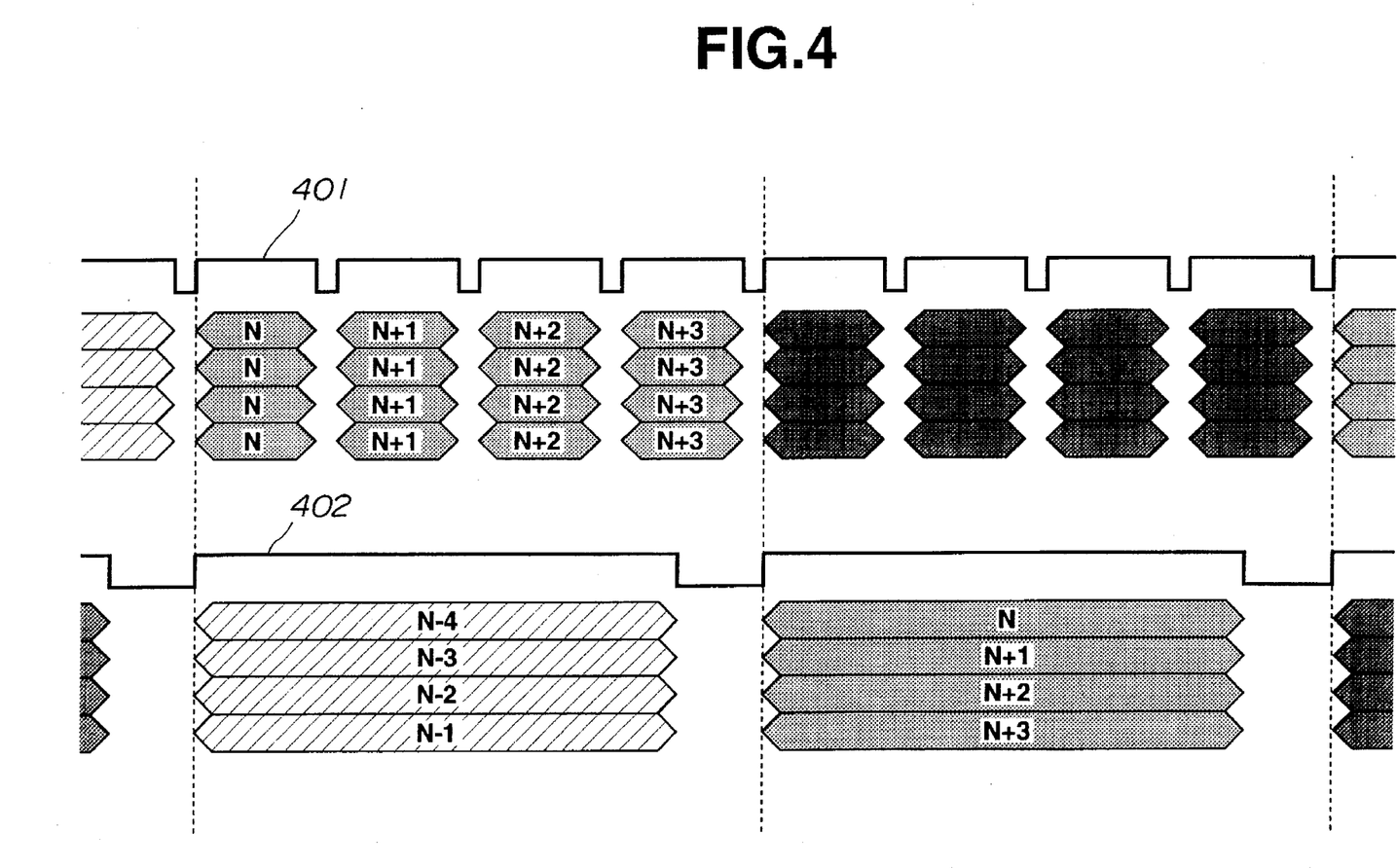
FIG. 4 is a diagram illustrating a pixel parallel/line parallel conversion operation.

In order to convert pixel-parallel image signals 301 for four pixels into a line parallel image signal 302 for four lines, the pixel parallel/line parallel conversion unit 104 is configured with 18 line buffers LB. FIG. 4 illustrates timings for the conversion operation. In FIG. 4, reference numeral 401 represents a signal indicating the effective image region of a pixel-parallel image signal in the direction of the line. Four parallel image signals for each of the N-th line, the (N+1)-th line, the (N+2)-th line and the (N+3)-th line are present in units of a pixel under the signal 401. The 4-pixel-parallel image signals for the N-th line are input to line buffers LB00–LB03. By sequentially reading the image signals from the line buffers LB00–LB03, a serial image signal for the N-th line can be obtained. Similarly, for the (N+1)-th line, the (N+2)-th line and the (N+3)-th line, serial image signals can be obtained using line buffers LB10–13, 20–23, and 30–33, respectively. Thus, pixel-parallel image signals are converted into a serial image signal for each line by the pixel parallel/line parallel conversion unit 104, and image signals for the N-th line, the (N+1)-th line, the (N+2)-th line and the (N+3)-th line are simultaneously transferred in parallel at a speed which is substantially ¼ of the speed at which the signals were input. Reference numeral 402 represents the image effective region of such a serial image signal.

As shown in FIG. 4, the pixel parallel/line parallel conversion unit 104 performs parallel outputs of image signals for the (N−4)-th line—the (N−1)-th line in parallel when receiving the image signals for the N-th line—(N+3)-th line. Accordingly, for this parallel processing, each of the respective line buffers LB00–LB33 has a capacity capable of storing image signals for two lines, so that writing of the next line can be performed in parallel to reading of an image signal for the preceding line. A pair of pixel parallel/line parallel conversion units 104 shown in FIG. 4 may be provided, and may be used alternately for writing and reading.

Figure 5:
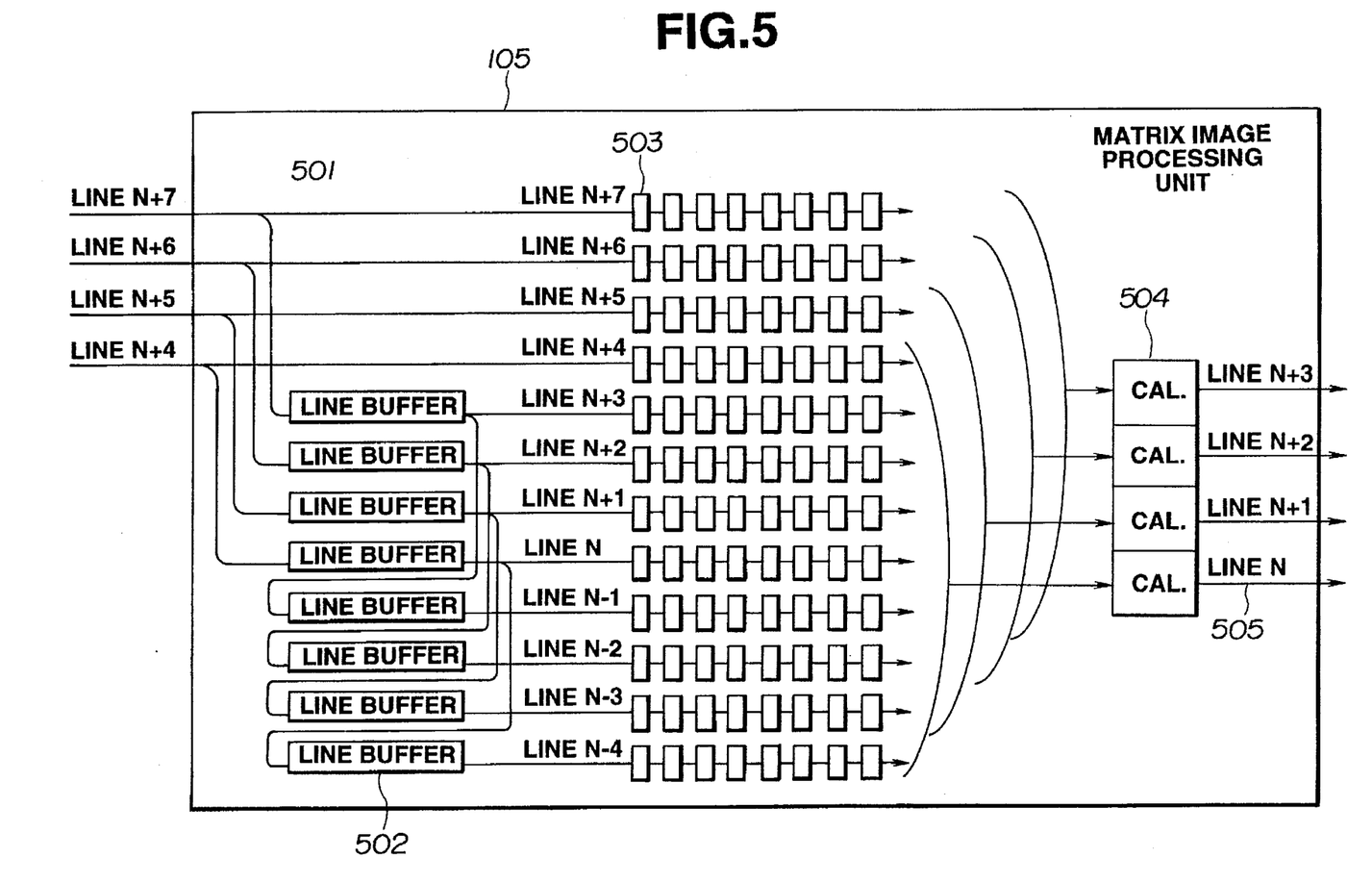
FIG. 5 is a diagram illustrating the configuration of an image processing unit shown in FIG. 1.

After conversion into the form of 4-line parallel transfer, image processing is performed by an image processing unit 105 shown in FIG. 5. The image processing includes various kinds of processing in which an image is dealt with in the form of a matrix, such as edge emphasis, smoothing processing or the like, and image modifying processing, such as shadowing, inclining, rotation or the like of an image. A description will be now provided of matrix image processing using a 9×9 square image matrix as one example of such image processing.

The matrix image processing comprises edge emphasis, smoothing, pattern matching in an area, or the like, which is relatively frequently used in image processing. Signals 501 for four lines, i.e., the (N+4)-th line, the (N+5)-th line, the (N+6)-th line and the (N+7)-th line, are input to the matrix image processing unit 105.

The matrix image processing unit 105 includes eight line buffers 502 each for delaying an image signal for one line, four input lines, and eight flip-flop circuits 503 for each of the eight line buffers 502. For example, since 4-line parallel transfer is being performed, an image signal input before an (N+4)-th-line image signal by one line via the same line is an N-th-line image signal. Similarly, an image signal input before an N-th-line image signal by one line via the same line is an (N−4)-th-line image signal. Accordingly, an N-th-line image signal is delayed by one line by the line buffer 502 and the (N−4)-th-line image signal is delayed by two lines by the line buffer 502, and the delayed signals are input to the flip-flop circuits 503 for delay in the main scanning direction simultaneously with the (N+4)-th-line image signal.

Image signals for the (N+1)-th line, the (N+2)-th line and the (N+3)-th line, and image signals for the (N−3)-th line, the (N−2)-th line and the (N−1)-th line to be input before image signals for the (N+5)-the line, the (N+6)-th line and the (N+7)-th line to be input to the remaining three lines, by one line and by two lines, respectively, are output from the line buffers 502.

By using the line buffers 502 in the above-described manner, all image signals for 12 lines from the (N−4)-th line to the (N+7)-th line are input to the flip-flop circuits 503 for delay in the main scanning direction in synchronization with one another.

That is, image signals for 12 consecutive lines in the sub-scanning direction are formed. From these image signals for 12 lines, four 9×9 matrices are formed which are shifted from each other by one line in the sub-scanning direction.

That is, image signals from the (N−4)-th line to the (N+4)-th line, image signals from the (N−3)-th line to the (N+5)-th line, image signals from the (N−2)-th line to the (N+6)-th line, and image signals from the (N−1)-th line to the (N+3)-th line are used for processing image signals for the N-th line, the (N+1)-th line, the (N+2)-th line, and the (N+3)-th line, respectively.

Accordingly, image signals from the (N−3)-th line to the (N+6)-th line can be shared by a plurality of matrices. Nine pixel signals which are consecutive in the main scanning direction are formed by using respective pixels delayed by one pixel by each of the flip-flop circuits 503 for delay in the main scanning direction.

Pixel signals of the four 9×9 matrices formed in the above-described manner are input to four calculation circuits 504, which perform predetermined calculations and output image signals 505 for the N-th line, the (N+1)-th line, the (N+2)-th line and the (N+3)-th line. Thus, image processing for line-parallel four-line image signals is completed.

After completing such image processing for which line-parallel processing is advantageous, a line parallel/pixel parallel conversion unit 108 converts the image signals into the form of pixel parallel transfer. That is, by switching to the pixel parallel transfer which is most frequently used in ordinary data transfer, a standard transferred image can be supplied to other units. The line parallel/pixel parallel conversion unit 106 performs an operation which is reverse to the operation of the pixel parallel/line parallel conversion unit 104. The image signal transfer method is not limited to 4-pixel parallel transfer. For example, image signals may be transferred in the form of a nonparallel serial signal in accordance with the transfer speed of the circuit of the following stage. Alternatively, image signals may also be transferred in the form of 8-pixel parallel transfer or 16-pixel parallel transfer for a circuit of the following stage having a low transfer speed.

As described above, in the present embodiment, means are provided for converting an image signal for each line into the form of line parallel transfer. After converting the transfer method, processing, such as matrix image processing or the like, is performed, and image signals are converted again into the form of pixel parallel transfer. Thus, as shown in FIG. 5, when processing four 9×9 image matrices, the processing can be performed only by eight line buffers as in the case of processing using a single matrix in which parallel processing of four signals is not performed, as in the conventional approach shown in FIG. 9. Although there is a limitation in the number of input terminals of an ASIC in the case of pixel parallel processing, the number of input terminals in the case of line parallel processing has the following value (assuming that an image signal comprises 8 bits for each input):

12 (lines)×8 (bits)=96 (the number of input terminals).

Accordingly, this is much easier to produce in an ASIC compared with an ASIC having 288 terminals in the case of pixel parallel processing shown in FIG. 10.

Although a description has been provided only of matrix image processing, various kinds of processing other than matrix processing may also performed as image processing. For example, error diffusion processing in which an error is diffused over a wide area, or rotation of image data stored in a page buffer is effective from the viewpoint of processing time and circuit scale.

In the configuration of the above-described embodiment, the CCD line sensor 101 includes 4-line CCD's, and image signals from four pixels 4n+1, 4n+2, 4n+3 and 4n+4 (n is an integer equal to or greater than 0) are output in parallel from the CCD line sensor 101.

Accordingly, the pixel parallel/line parallel conversion unit 104 performs pixel parallel/line parallel conversion for 4-pixel-parallel image signals output from the CCD line sensor 101 and passing through the A/D conversion unit 102 and the shading processing unit 103.

However, the CCD line sensor 101 need not always provide a 4-pixel-parallel output, but may also provide an odd/even 2-pixel-parallel output or a pixel-serial output.

In such a case, a pixel parallel conversion circuit receives a 2-pixel-parallel output image signal or a pixel-serial output image signal and converts the received signal into a 4-pixel-parallel output image signal. The 4-pixel-parallel image signal from the pixel parallel conversion circuit is input to the pixel parallel/line parallel conversion unit 104, which converts the input signal into a line-parallel image signal, and the above-described processing is executed.

Second Embodiment

Figure 6:
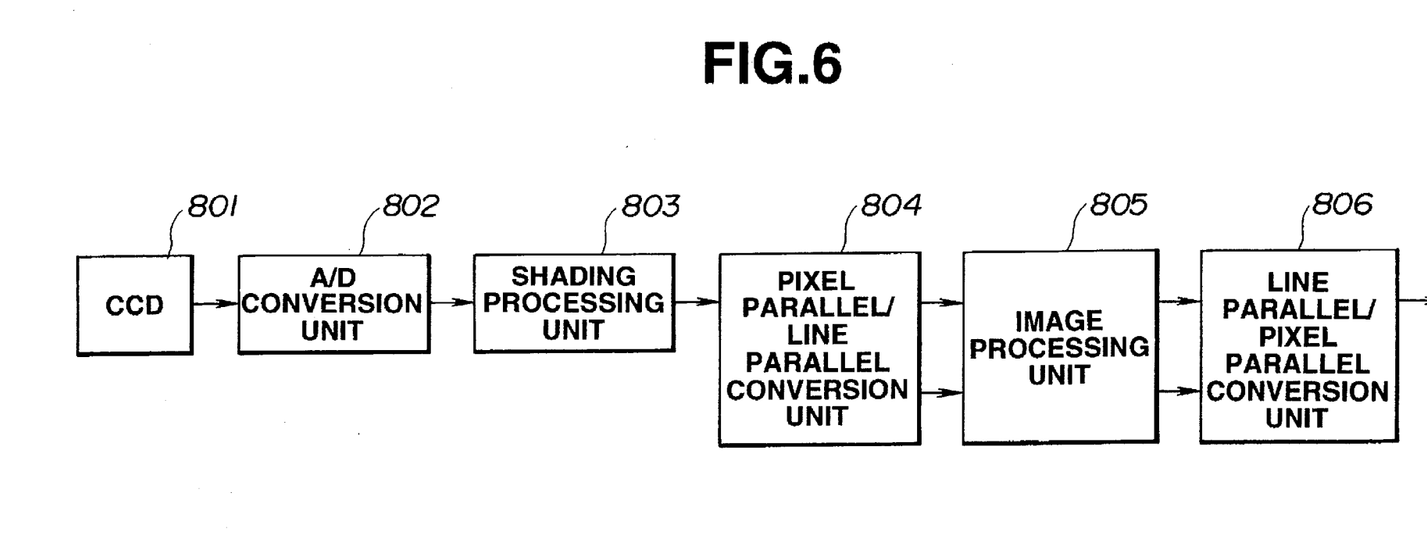
FIG. 6 is a diagram illustrating the configuration of an image processing apparatus according to a second embodiment of the present invention.

FIG. 6 illustrates the configuration of an image processing apparatus according to a second embodiment of the present invention.

Although the configuration of this apparatus is basically the same as that in the first embodiment, a single image signal is output from a CCD line sensor 801 as serial data for each line. The image signal is converted into a normalized digital image signal after passing through an A/D conversion unit 802 and a shading processing unit 803. A line parallel conversion unit 804 combines image signals for two lines which have been serially input, and outputs them as two-line parallel signals.

Figure 7:
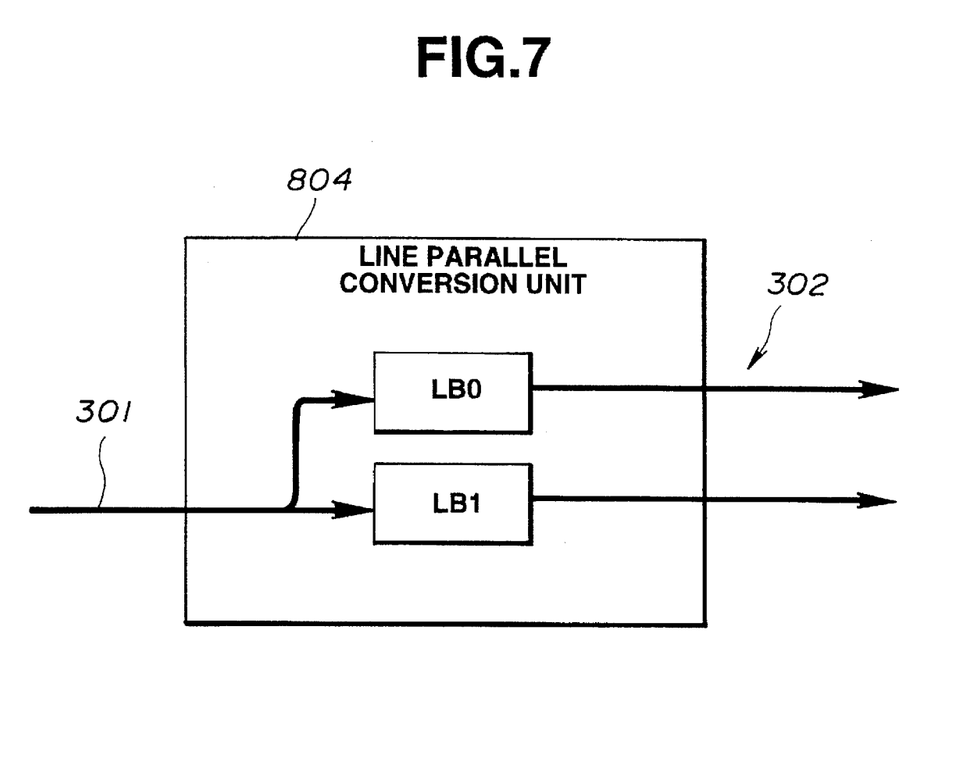
FIG. 7 is a diagram illustrating the configuration of a line parallel conversion unit shown in FIG. 6.

FIG. 7 illustrates the configuration of the line parallel conversion unit 804. In FIG. 7, each of symbols LB0 and LB1 represents a line buffer, whose capacity is large enough to store at least image signals for two lines.

Figure 8:
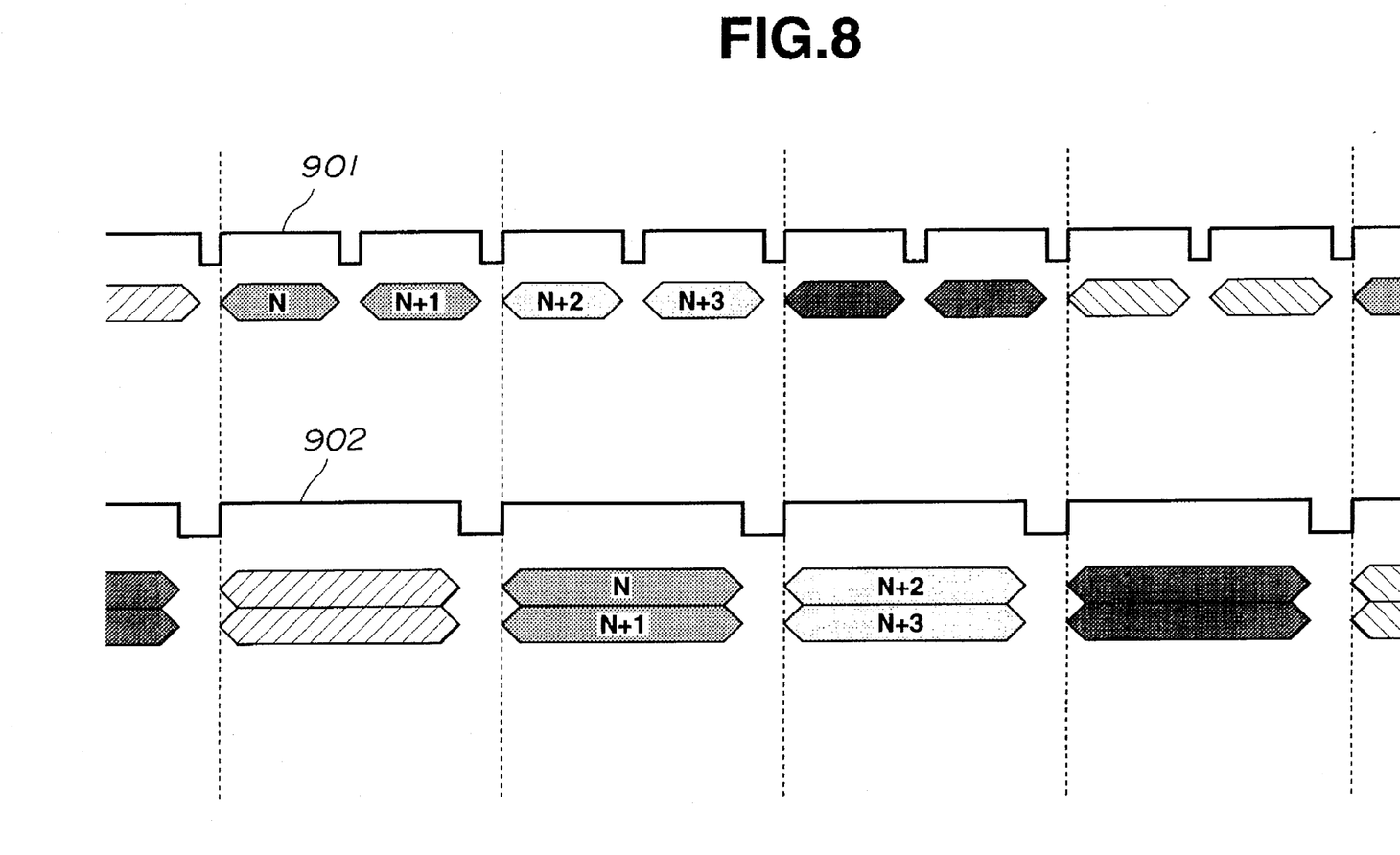
FIG. 8 is a diagram illustrating a line parallel conversion operation.

FIG. 8 illustrates timings of the conversion operation of the line parallel conversion unit 804.

A line-serial image signal 301 from the shading processing unit 803 is alternately written in the line buffers LB0 and LB1. That is, an image signal for the N-th line is written in the line buffer LB0 and an image signal for the (N+1)-th line is written in the line buffer LB1. A signal 901 indicates the effective region of an input image signal. Thereafter, the image signals for the N-th line and the (N+1)-th line from the line buffers LB0 and LB1, respectively, are subjected to parallel transfer at a speed substantially equal to ½ of the speed at which the signals were input, as line-parallel signals 302.

In parallel to this parallel transfer, image signals for the (N+2)-th line and the (N+3)-th line are written in the line buffers LB0 and LB1, respectively, and the image signals for the (N+2)-th line and the (N+3)-th line are subjected to parallel transfer. A signal 902 indicates the effective region of an image signal subjected to parallel transfer.

Figure 9:
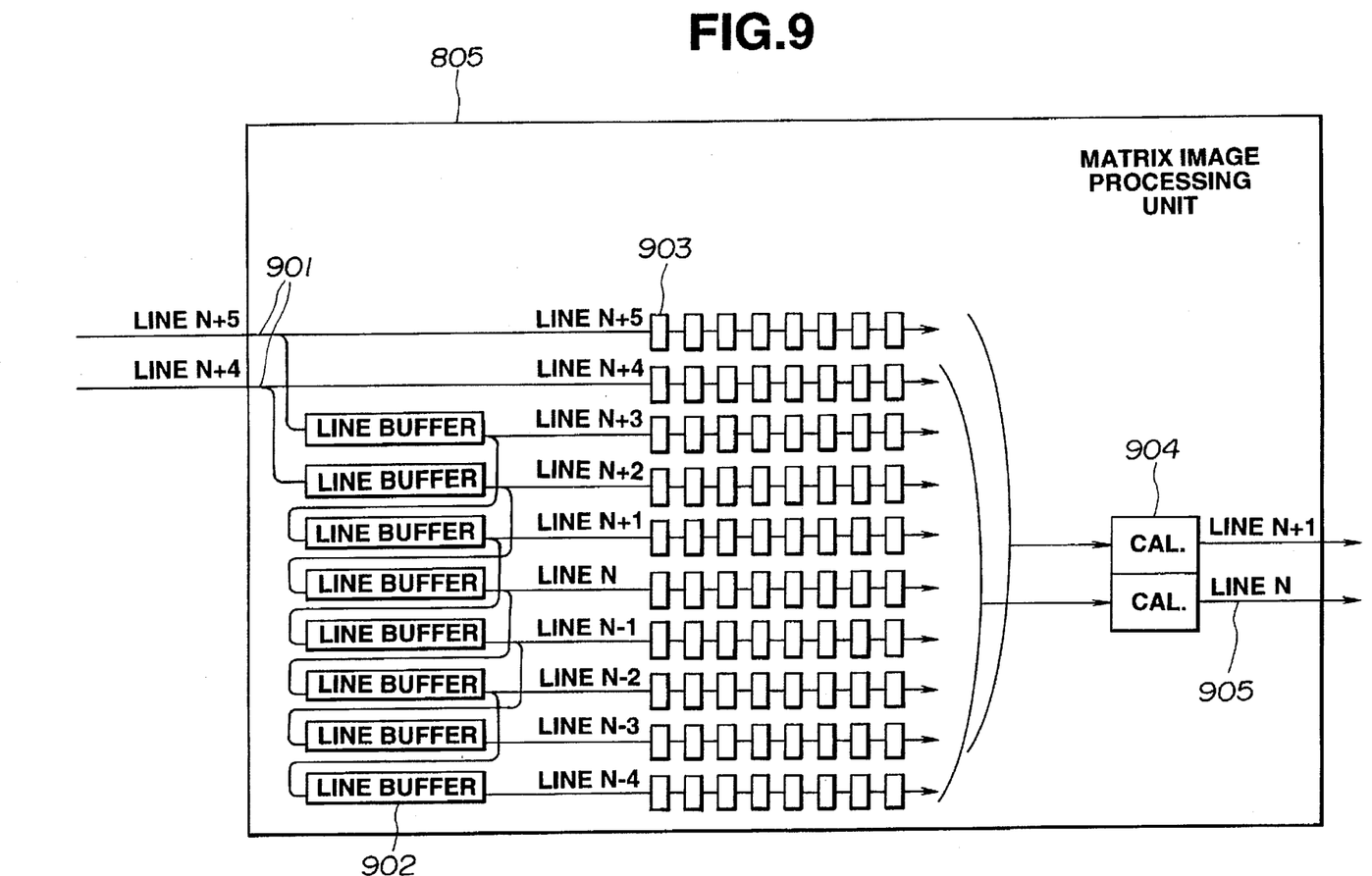
FIG. 9 is a diagram illustrating the configuration of an image processing unit shown in FIG. 6.

The image signal converted into a two-line parallel signal is subjected to image processing by an image processing unit 805. FIG. 9 illustrates the configuration of the image processing unit 805. As in the first embodiment, the image processing unit 805 performs matrix image processing using a 9×9 square image matrix.

The image processing unit 805 includes eight line buffers 902 each for delaying an image signal for one line, two input lines, and eight flip-flop circuits 903 for each of the eight line buffers 902. For example, since two-line parallel transfer is performed, an image signal input via the same line before an image signal for the (N+4)-th line by one line is an image signal for the (N+2)-th line. Hence, the image signal for the (N+2)-th line is delayed by one line by the line buffer 902, and is input to the flip-flop circuits 903 for delay in the main scanning direction simultaneously with the (N+4)-th-line image signal. Similarly, all image signals for 10 lines from the (N−4)-th line to the (N+5)-th line are input to the flip-flop circuit 903 for delay in the main scanning direction in synchronization with one another. At that time, image signals for ten lines are present, whereby two 9×9 matrices which are shifted from each other by one line in the sub-scanning direction can be formed. That is, image signals from the (n−3)-th line to the (n+4)-th line can be shared by the two matrices. By using respective pixels delayed by one pixel by each of the flip-flop circuits 903 for delay in the main scanning direction, nine pixels which are consecutive in the main scanning direction are formed.

Pixel signals of the two 9×9 matrices formed in the above-described manner are input to two matrix calculation circuits 904, which peform predetermined matrix calculation and output image signals 905 for the N-th line and the (N+1)-th line. Thus, matrix image processing for line parallel image signals for two lines is completed.

After completing such image processing for which line-parallel processing is advantageous, a line parallel/pixel serial conversion unit 806 converts the image signals into the original form of pixel serial transfer. Thus, a standard transferred image can be supplied to other units. The line parallel/pixel serial conversion unit 806 performs an operation which is opposite to the operation of the line parallel conversion unit 804 shown in FIG. 7.

As described above, in the present embodiment, means for converting a pixel-serial image signal for each line into the form of line parallel transfer is provided. After converting the transfer method, processing, such as matrix image processing or the like, is performed, and image signals are converted again into the form of pixel serial transfer. Thus, as shown in FIG. 9, when processing two 9×9 image matrices, the processing can be performed by only eight line buffers as in the case of processing using a single matrix in which parallel processing of two systems is not performed.

Although a description has been provided only of matrix image processing, various kinds of processing other than matrix processing may also performed as image processing. For example, error diffusion processing in which an error is diffused over a wide area, or rotation of image data stored in a page buffer is effective from the viewpoint of processing time and circuit scale.

The matrix image processing is not limited to a 9×9 square image matrix, but may also be applied to matrices having other sizes. When applying the processing to a matrix having another size, the number of buffer memories, the number of flip-flop circuits, the number of lines after line parallel conversion, and the like are, of course, changed appropriately in accordance with the processing.

As described above, according to the present invention, input means for inputting an image signal for each line, conversion means for converting the image signal for each line input from the input means into image signals parallel for a plurality of lines, and processing means for performing image processing for each of the image signals for the plurality of lines output from the conversion means in parallel are provided. Hence, when performing image processing using image signals for a plurality of lines, such as edge emphasis, smoothing, pattern matching or the like, the image processing can be executed at a high speed with a small-scale circuit configuration.

The individual components shown in outline or designated by blocks in the drawings are all well known in the image signal processing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image signal processing apparatus comprising:

input means for inputting an image signal representing a line of an image for a plurality of consecutive lines of the image;

conversion means for converting the input image signal into parallel converted image signals and for outputting the converted image signals representing a plurality of consecutive lines of the image in parallel;

forming means for forming a plurality of image matrices in parallel, each consisting of m×n pixels, on the basis of the output converted image signals and for outputting the formed plurality of image matrices in parallel; and processing means for performing a matrix calculation on each of the formed plurality of image matrices in parallel and for outputting processed image signals representing a plurality of consecutive lines of the image in parallel.

2. An apparatus according to claim 1, wherein said processing means performs the same matrix calculation in parallel on each of the formed plurality of image matrices.

3. An apparatus according to claim 1, wherein said forming means forms the plurality of image matrices by delaying each of the converted image signals.

4. An apparatus according to claim 1, wherein said input means inputs image signals representing a plurality of pixels in parallel.

5. An apparatus according to claim 1, wherein said forming means forms the plurality of image matrices by partially sharing the converted image signals.

6. An apparatus according to claim 1, further comprising second conversion means for converting the processed image signals representing a plurality of consecutive lines of the image into serial converted image signals and for outputting the converted image signals representing a line of the image.

7. An image signal processing method comprising the steps of:

inputting an image signal representing a line of an image for a plurality of consecutive lines of the image;

converting the input image signal into parallel converted image signals representing a plurality of consecutive lines of the image;

outputting the converted image signals in parallel;

forming a plurality of image matrices in parallel, each consisting of m×n pixels, on the basis of the output converted image signals;

outputting the formed plurality of image matrices in parallel;

performing a matrix calculation on each of the formed plurality of image matrices in parallel; and outputting, on the basis of the matrix calculation, processed image signals representing a plurality of consecutive lines of the image in parallel.

8. A method according to claim 7, wherein in said matrix calculation step, the same matrix calculation is performed in parallel for each of the formed plurality of image matrices.

\* \* \* \* \*

UNITED STATES PATENT AND TRADEMARK OFFICE
CERTIFICATE OF CORRECTION

PATENT NO. : 5,650,862

DATED : July 22, 1997

INVENTOR(S): HIDEAKI SHIMIZU ET AL.

It is certified that error appears in the above-identified patent and that said Letters Patent is hereby corrected as shown below:

<u>COLUMN 4</u>
Line 44, "18" should read --16--.

<u>COLUMN 5</u>
Line 44, "(N+5)-the" should read --(N+5)-th--.

<u>COLUMN 6</u>
Line 13, "108" should read --106--.

Signed and Sealed this

Eleventh Day of August 1998

Attest:

BRUCE LEHMAN

Attesting Officer     Commissioner of Patents and Trademarks